United States Patent [19]

Gorzynski et al.

[11] Patent Number: 4,777,224

[45] Date of Patent: Oct. 11, 1988

[54] ANIONIC POLYURETHANES

[75] Inventors: Marek Gorzynski; Horst Schürmann, both of Düren, Fed. Rep. of Germany

[73] Assignee: AKZO NV, Arnhem, Netherlands

[21] Appl. No.: 125,705

[22] Filed: Nov. 27, 1987

[30] Foreign Application Priority Data

Nov. 28, 1986 [DE] Fed. Rep. of Germany ....... 3640752

[51] Int. Cl.$^4$ ............................................. C08G 18/34
[52] U.S. Cl. .................................. 525/454; 427/391; 528/49; 528/60; 528/65
[58] Field of Search ..................... 525/454; 528/49, 60, 528/65; 427/391

[56] References Cited

FOREIGN PATENT DOCUMENTS

| 1495847 | 12/1964 | Fed. Rep. of Germany . |
| 1720639 | 6/1971 | Fed. Rep. of Germany . |
| 1696280 | 1/1974 | Fed. Rep. of Germany . |
| 2651506 | 5/1978 | Fed. Rep. of Germany . |
| 2457972 | 11/1979 | Fed. Rep. of Germany . |
| 1076688 | 7/1967 | United Kingdom . |

Primary Examiner—Maurice J. Welsh
Attorney, Agent, or Firm—Parkhurst & Oliff

[57] ABSTRACT

Anionic polyurethanes are produced by reacting an aliphatic dihydroxy compound, which has an aliphatic substituent with at least 10 carbon atoms, with a polyisocyanate to form a prepolymer with an NCO end group, and for the purpose of chain lengthening, by reacting the prepolymer with an aliphatic diol, which carries an acid group capable of salt formation, and by converting the said acid group totally or partially into a salt. In the production of the polyurethane, polyether compounds with at least one OH group, particularly polyalkylene glycols such as polyethylene glycol, are used additionally. The resulting anionic polyurethanes are particularly suitable as a sizing agent for paper and permit sizing in the acid pH region as well; the sizing agent is furthermore less sensitive to polyvalent cations such as calcium and aluminum ions.

26 Claims, No Drawings

ANIONIC POLYURETHANES

TECHNICAL FIELD

The invention relaltes to anionic polyurethanes, a process for the producton thereof, and the use thereof as sizing agents in paper manufacture.

BACKGROUND

Polyurethanes with an ionic nature, which include the anionic polyurethanes, are very old in the art. Starting materials, which contain groups capable of salt formation or which already contain salt groups, can be used in the production of this type of polyurethanes. These salt groups or groups capable of salt formation can be present both in the chain lengthening agent and in the polyisocyanate or in the polyhyrdroxy compound, e.g., a polyester, employed in the first stage of the production process.

Anionic polyurethanes are produced by additionally using compounds for the synthesis of the polyurethanes so that the final polyurethane contains an acid group, e.g., the carboxyl group. By neutralization with a suitable base, the polyurethane is converted into a salt; the polyurethane molecule then exists as an anion. It is naturally also possible even at the outset to use suitable starting materials in the form of a salt in the synthesis of anionic polyurethanes. Defined as anionic polyurethanes within the scope of the invention are also such polyurethanes in which the polyurethane molecule also has a cationic moiety, in addition to the anionic part, i.e., it possesses a more or less amphoteric nature.

Numerous processes for the production of anionic polyurethanes are already known. Thus, for example, Unexamined West German Patent Application No. DE-OS No. 1,495,847 discloses a process in which rather high molecular weight polyhydroxy compounds such as polyesters, polyacetals, polyethers, etc., enter into a reaction with polyisocyanates, and whereby a compound with at least one hydrogen atom reacting with isocyanate groups and at least one salt-like group or a group capable of salt formation is used. In this case, salt groups include groups which are derived both from sulfonic acids and also from carboxylic acids and acids of phosphorus. The numerous such compounds include, for example, lactic acid, tartaric acid, 4,6-dihydroxyisophthalic acid, uric acid, barbituric acid, oxalic acid, malonic acid, diglycolic acid, aminosulfonic acids, phosphinic acids, phosphonous acids, phosphonic acids, and phosphoric acids.

The polyurethanes described therein can be processed into films and sheets and serve to coat and impregnate woven and nonwoven textiles, leather, paper, and the like, as well as to provide an antistatic and wrinkle-resistant finish. These polyurethanes are less suitable as a sizing agent for paper, because they produce high Cobb values and low degrees of sizing.

Anionic polyurethanes of similar structure, which differ from the abovementioned polyurethanes in the use of very special diaminocarboxylic acids as salt-forming compounds, are disclosed in Unexamined West German Patent Application No. DE-OS 1,720,639. Diaminocarboxylic acids are used here in which the carboxylic acid group is bound via an amide bond to the chain, which carries both amino groups. These anionic polyurethanes as well are little suitable as sizing agents for paper.

West German Patent Specification No. DE-PS 2,457,972 discloses anionic polyurethanes, which are obtained by reaction of an aliphatic dihydroxy compound, which has an aliphatic substituent with at least 10 carbon atoms, with a polyisocyanate to a prepolymer with an NCO end group, by chain lengthening of the resulting prepolymer with an aliphatic diol, which carries an acid group capable of salt formation, and by total or partial conversion of the acid group into a salt by reaction with a base or by chain lengthening of the prepolymer with an aliphatic diol, which already carries a suitable salt group. It is also possible to react the prepolymer with NCO groups first with an aliphatic trihydroxy compound in a molar ratio of about 1:1 and then with a cyclic anhydride of a dicarboxylic acid, and finally to convert the acid group arising thereby totally or partially into a salt by reaction with a base.

These anionic polyurethanes are very suitable for the sizing of paper; they can be used both for surface sizing and also in beater sizing.

However, these anionic polyurethanes are sensitive to polyvalent cations, as they are present if hard water, for example, is used for processing or if enzymatically degraded starch is used. In the presence of such ions, problems may arise in sizing. Calcium and aluminum ions can be specified in this case as problematic polyvalent ions. These anionic polyurethanes also exhibit a certain sensitivity to acids, so that precipitation of the anionic polyurethane can occur especially in beater sizing starting at pH 6.5, so that the effectiveness of sizing is reduced.

Thus although numerous polyurethanes with an anionic structure are already known, there still is a need for anionic polyurethanes with improved properties, as well as for suitable production processes, especially however for anionic polyurethanes that are suitable as sizing agents for paper for highly diverse purposes.

SUMMARY OF THE INVENTION

An object of the invention, therefore, is to provide anionic polyurethanes that produce high degrees of sizing and suitable Cobb values in the sizing of paper, that are less sensitive to electrolytes, especially polyvalent ions such as calcium and aluminum ions, and that can be used in sizing particularly without complication in the acid region, i.e., for example, in the important range of pH 4.5-5, but also in neutral and basic regions.

This and other objects are achieved with a process for the production of anionic polyurethanes by reaction of an aliphatic dihydroxy compound, which has an aliphatic substituent with at least 10 carbon atoms, with a polyisocyanate to a prepolymer with an NCO end group, by chain lengthening of the resulting prepolymer with an aliphatic diol, which has an acid group capable of salt formation, and by total or partial conversion of the acid group into a salt by reaction with a base or by a chain lengthening of the prepolymer with a suitable aliphatic diol, which already has a suitable salt group. The inventive process is characterized by the additional use of a polyether compound with at least one OH group for the synthesis of the anionic polyurethane.

The invention further comprises a process for the production of anionic polyurethanes by reaction of an aliphatic dihydroxy compound, which has an aliphatic substituent with at least 10 carbon atoms, with a polyisocyanate to a prepolymer with an NCO end group, reaction of the resulting prepolymer with an aliphatic trihydroxy compound in a molar ratio of about 1:1, and further reaction with a cyclic anhydride of a dicarboyxlic acid, and subsequent total or partial conversion of the acid group arising thereby into a salt by reaction with a base. This process is also characterized by the additional use of a polyether compound with at least one OH group for the synthesis of the anionic polyurethane.

The invention also comprises anionic polyurethanes obtained according to the processes of the invention. It further comprises the employment of the inventive anionic polyurethanes as a sizing agent for paper.

DETAILED DESCRIPTION OF PREFERRED EMBODIMENTS OF THE INVENTION

The polyether compounds are preferably polyether compounds with two OH groups. Polyalkylene glycols are particularly advantageous. Very suitable as a polyalkylene glycol is polyethylene glycol.

The polyether compound is advantageously used in quantities of 5 to 50 weight percent referring to the total weight of the reacting starting compounds. It is particularly advantageous if 20 to 30, more preferably 20 to 25, weight percent of the polyether compound is used.

Very suitable within the scope of the invention as polyether compounds are polyalkylene glycols with a molecular weight of 200 to 6,000, especially 1,000 to 3,000.

The polyether compound is advantageously used for reaction with the prepolymer. Particularly suitable in this case are polyether compounds with two OH gropus, especially with two terminal OH groups such as polyalkylene glycols.

The reaction can be run in a solvent. Acetone is especially suitable as the solvent.

In an advantageous embodiment of the process of the invention, the aliphatic diol, which carries an acid group capable of salt formation or already has a suitable salt group, is employed for chain lengthening in a mixture with an aliphatic diol which contains tertiary nitrogen. The molar ratio of the aliphatic diol with tertiary nitrogen to the aliphatic diol with the acid group or salt group is a maximum of 1:1. N-methyldiethanolamine is advantageously employed as the aliphatic diol with tertiary nitrogen.

In the reaction in solvents, concentrations of 10 to 50%, preferably 25 to 50%, are used expediently. Concentration is here defined as the percentage by weight of the starting substances per percentage by weight of the solvent and starting substances.

Especially suitable within the scope of the invention are aliphatic dihydroxyl compounds, which have an aliphatic substituent with at least 16 carbon atoms. Defined as aliphatic dihydroxyl compounds within the scope of this invention are nonpolymeric aliphatic glycols, i.e., low-molecular-weight organic compounds, which have two hydroxyl groups in positions 1,2- or 1,3- or in some other position, for example, the alpha, omega-position. Substituted aliphatic dihydroxyl compounds are used preferably in which the two hydroxyl groups are linked via a maximum of 7 atoms in the aliphatic chain.

The aliphatic substituent, which the aliphatic dihydroxyl compound must have, can be situated at a carbon atom which carries one of the two hydroxyl groups; however, it can also be bound to a carbon atom which is situated between the carbon atoms that have the two hydroxyl functions. The substituent preferably has 16 to 22 carbon atoms.

It is furthermore not absolutely necessary that the aliphatic chain of the glycol, by means of which the two hydroxyl groups are linked, contains only carbon atoms; thus, a carbon atom can also be replaced by a heteroatom such as oxygen or nitrogen. If the heteroatom situated in the aliphatic chain is nitrogen, then the aliphatic substituent with at least 10, preferably 16, carbon atoms can also be bound directly to the heteroatom.

The aliphatic substituent on the dihydroxyl compound must have at least 10, preferably at least 16, carbon atoms. It is not absolutely necessary that the substituent is only a suitable carbon residue. Also possible as the aliphatic substituent within the scope of the invention is the group RCOO-, where R is an aliphatic residue with at least 9, preferably at least 15, carbon atoms. Particularly suitable are glycerol monofatty acid esters and trimethylolpropane monofatty acid esters, e.g., glycerol monostearate, glycerol monodocosanoic acid ester, and trimethylolpropane monostearate. 1,2-Dihydroxyoctadecane and 1,4-dihydroxyoctadecane have proven to be very suitable within the scope of the invention as other dihydroxyl compounds that have a substituent with the suitable carbon number.

If there is a heteroatom in the aliphatic chain, then a requirement for the novel process is that in the reaction of the dihydroxy compound with polyisocyanates, there is no residue that can react with isocyanate groups at the heteroatom, i.e., that, if, for example, nitrogen is present in the chain, the third valence must be substituted by a residue with no active hydrogen atoms. In this case, the substitution can be carried out such that an additional amine bond arises. Compounds of this type are N,N-bis(hydroxyalkyl)alkylamines, of which N-stearyldiethanolamine is preferred. An amide bond can also be formed, and N,N-bis(hydroxyalkyl)acid amide is then obtained.

Particularly suitable within the scope of the invention is N,N-bis(beta-hydroxyethyl)stearyl amide.

The reaction of the substituted monomeric aliphatic dihydroxyl compound with a polyisocyanate is best carried out in an anhydrous solvent, preferably in acetone. Other solvents that are inert to isocyanate groups or exhibit only a minor reactivity in comparison with the reaction components are suitable as the reaction medium. Examples of such solvents include: tetrahydrofuran, dimethylformamide, chloroform, perchloroethylene, methylene chloride, methylethyl ketone, ethyl acetate, and dimethylsulfoxide.

The reaction of the aliphatic substituted dihydroxyl compound with the polyisocyanate, however, can also be run without a solvent in the melt.

Catalysts can be employed in the reaction of the dihydroxyl compound with the polyisocyanate. Diacetoxydibutylin, inter alia, proved particularly advantageous as a catalyst. Other catalysts include: dibutyltindilaurate, cobalt naphthenate, zinc octoate, as well as tertiary amines, e.g., triethylamine or 1,4-diazabicyclo-[2,2,2]octane.

The polyisocyanates that can be employed in the synthesis of the prepolymer can be either aliphatic or aromatic in nature. Mixed aliphatic/aromatic compounds are also suitable. Diisocyanates, triisocyanates, or polyfunctional isocyanates or mixtures thereof can be used. Diisocyanates are preferably employed. Toluylene diisocyanate, diphenylmethane-4,4'-diisocyanate, and hexamethylene diisocyanate proved particularly effective. "Capped" diisocyanates can also be employed, such as, for example, the reaction product of diphenylmethane-4,4′-diisocyanate with 2 moles of phenol.

The polyether compounds can be employed additionally even in the production of the prepolymer. The polyether compounds, however, are advantageously employed in the subsequently performed chain lengthening.

The ratio of the reaction partners, namely the molar ratio of the dihydroxyl compound to polyisocyanate, can be varied over a relatively broad range. Thus it is possible, for example, to work with a molar ratio of the dihydroxyl compound to diisocyanate of 1:1.1 to 1:3. Particularly suitable is the molar range of about 1:1.5 to 1:2.5; in this case, the ratio can be precisely set to 1:2; in many cases, however, it is advantageous to select a somewhat higher value for the diisocyanate and to work with ratios of about 1:2.1 to 1:2.3.

When the polyether compound is employed in the production of the prepolymer, care is to be taken that sufficient NCO groups are available for the subsequent chain lengthening.

The resulting prepolymer can then be reacted with an aliphatic diol, which carries an acid group capable of salt formation. This reaction is designated as chain lengthening. Groups such as ($-SO_2OH$, $-COOH$), etc., are understood to be acid groups within the scope of the invention. A polyurethane in which the above-mentioned groups are present is formed by this chain lengthening. These are then neutralized by reaction with a base such as, for example, sodium hydroxide solution or triethylamine. In so doing, the polyurethane is converted into a salt. The polyurethane molecule is present as an anion.

It is also possible, however, to undertake chain lengthening with an aliphatic dihydroxyl compound, which is already available as a suitable salt. In other words, chain lengthening agents are used in which the acid group such as, for example, the carboxyl group, was already totally or partially neutralized.

Particularly suitable as chain lengthening agents are 2,2-bis(hydroxymethyl)propionic acid, trimethylolpropane monosuccinic acid ester, trimethylolethane monosuccinic acid ester, and similar compounds. In chain lengthening, the diol can be employed in approximately equivalent amounts relative to the prepolymer. It is also beneficial, however, to employ a slight excess of about 5 to 10 mole percent of the diol.

The use of the polyether compound can be carried out in various ways. It is possible to employ the aliphatic diol, which carries an acid group capable of salt formation or a salt group, in combination with the polyether compounds for chain lengthening.

The diol and the polyether compound, however, are preferably added at separate times. It is particularly advantageous to add first the aliphatic diol with the acid or salt group and then, after the diol has largely reacted, to add the polyether compound.

In an advantageous embodiment, a diol which contains tertiary nitrogen is employed in addition to the diol that possesses an acid group capable of acid formation or already has a salt group and the polyether compound. Another group that is cationic in nature is thereby incorporated into the polyurethane. Within the scope of the invention, this diol with tertiary nitrogen is employed additionally in an amount such that the molar ratio of the diol with tertiary nitrogen to the diol with the acid group or the already neutralized acid group is a maximum of 1:1. At the 1:1 ratio, the polyurethane is amphoteric in nature, i.e., anionic groups and cationic groups are present in equal amounts in the polyurethane. The molar ratio of cationic groups to anionic groups is expediently at least 0.1:1 in this embodiment.

Compounds such as the preferred N-methyldiethanolamine can be used as diols that contain tertiary nitrogen. However, compounds such as N-n-butyldiethanolamine, N-tert-butyldiethanolamine, N-methyldipropanolamine, N-N-bis(2-hydroxyethyl)-p-toluidine, and the like may also be used.

It is expedient in the chain lengthening to add first the diol with the acid group, then the diol with the tertiary amino group, and in conclusion the polyether compound.

After the termination of chain lengthening, insofar as a salt was not already used for chain lengthening, the acid group in the chain lengthening agent is neutralized by addition of a base, e.g., triethylamine. The neutralization can also proceed with other bases such as, for example, sodium hydroxide solution, potassium hydroxide solution, or other amines.

The organic solvent can be removed by evaporation, e.g., in a rotary evaporator, so that a dry polyurethane is obtained, which can be shipped in the form of a powder.

It is also possible, however, to add water to the organic solution and to remove the organic solvent, if it has a lower boiling point than water, by vacuum distillation. This is especially beneficial when acetone is used.

Compounds defined as polyether compounds with at least one OH group within the scope of the invention include addition products of alkylene oxides, particularly ethylene oxides, to alcohols; polyalkylene glycols such as polyethylene glycol, polypropylene glycol, polytetramethylene glycol, and the like; polycarbonates, polyether carbonates, as they are produced by the reactions of phosgene and polyalkylene glycols; and other polyether esters, e.g., of polyalkylene glycols and adipic acid. It is important that the polyether compound has at least one OH group, preferably a terminal OH group, so that the polyether compound can react with one of the present NCO groups and thus be incorporated into the polyurethane molecule.

The amount of the polyether compound incorporated into the polyurethane can be varied over a relatively broad range. It is expedient to use a quantity of the polyether compound such that at least 5 weight percent of the polyether groups is in the anion. It is possible to increase the proporation of the polyether in the polyurethane up to about 60 weight percent.

The aqueous dispersions or solutions obtained during production can be used directly for sizing. An unexpected finding was that the obtained dispersions or solutions are very stable, and thus storable for a long time. The sizing agent exhibits extraordinarily good activity even in low concentrations. Even concentrations of 0.2% produce high degrees of sizing and low Cobb values.

It was particularly unexpected that the anionic polyurethanes produced according to the invention also permit sizing in hard water. Thus, sizing can be readily carried out in water with a high degree of hardness. No precipitation was observed even with water with a degree of hardness of 50 German degrees of hardness.

Another unexpected advantage which the invention offers is the fact that the anionic polyurethane produced according to the invention can be used without difficulty in sizing in an acid environment. Precipitation does not occur so that a high degree of sizing and satisfactory Cobb values are achieved both with beater sizing and surface sizing.

It was especially unexpected, furthermore, that the polyurethanes produced according to the invention can also be used during coating of paper together with latex. In this way, paper that has an especially fine coating and frequently can be classified as low-weight-coated papers can be produced with the use of the inventive polyurethanes.

The invention will now be described in greater detail with the following non-limiting examples.

EXAMPLE 1

The apparatus is a heatable 500-ml-capacity round-bottom three-neck flask, which is equipped with a stirrer, reflux condenser with drying tube, and a dropping funnel.

17.9 g of glycerol monostearate of commercial grade (0.05 mole) are provided together with 50 g of anhydrous acetone in the flask. Thereto are added 17.9 g (0.1028 mole) of a mixture of toluylene diisocyanate (2.4) and (2.6) (80:20) and 1 mg of dibutyltin diacetate. The reaction mixture is heated for 30 minutes to boiling.

Then 4.64 g (0.0346 mole) of dimethylolpropionic acid, 1.03 g (0.00865 mole) of N-methyldiethanolamine, 13.5 g (0.00675 mole) of polyethylene glycol with an average molecular weight of 2,000, and 25 g of anhydrous acetone are added successively thereto, and the reaction mixture is heated to boiling. After a reaction time of 60 minutes, a moderately viscous solution of the polyurethane results.

For salt formation, 26 ml of 1N sodium hydroxide solution are added first with stirring and then 315 ml of distilled water are added over a 10-minute period.

After acetone is evaporated by vacuum distillation, an approximately 15% clear solution of the polyurethane ionomer is obtained.

EXAMPLE 2

17.9 g (0.05 mole) of glycerol monostearate of commercial grade are provided together with 50 g of anhydrous acetone. Thereto are added 17.9 g (0.1028 mole) of a mixture of toluylene diisocyanate (2.4) and (2.6) (80:20) and 11 mg of dibutyltin diacetate. The reaction mixture is heated for 30 minutes to boiling. The 4.02 g (0.0300 mole) of dimethylolpropionic acid, 1.57 g (0.0132 mole) of N-methyldiethanolamine, 13.5 g (0.00675 mole) of polyethylene glycol with an average molecular weight of 2,000, and 25 g of anhydrous acetone are added successively thereto, and the reaction mixture is heated to boiling.

After a reaction time of 60 minutes, a moderately viscous solution results. For salt formation, 17 ml of 1N NaOH are added first with stirring and then 314 ml of distilled water are added over a 10 minute period.

After acetone is evaporated by vacuum distillation, an approximately 15% opaque solution of the polyurethane ionomer is obtained.

EXAMPLE 3

14.32 g (0.04 mole) of glycerol monostearate of commercial grade is provided together with 50 g of anhydrous acetone. Thereto are added 20 g of polyethylene glycol with an average molecular weight of 2,000 (0.01 mole) and 17.9 (0.1028 mole) of a mixture of toluylene diisocyanate (2.4) and (2.6) (80:20) and 11 mg of dibutyl- tin diacetate. The reaction mixture is heated to boiling for 30 minutes. Then 6.03 g (0.045 mole) of dimethylolpropionic acid, 0.60 g (0.005 mole) of N-methyldiethanolamine, and 25 g of anydrous acetone are added successively, and the reaction mixture is heated to boiling.

After a reaction time of 60 minutes, a moderately viscous solution results. For salt formation, 40 ml of 1N sodium hydroxide solution are added first with stirring and then 330 ml of distilled water are added over a 10-minute period. After acetone is evaporated by vacuum distillation, an approximately 15% opaque solution of the polyurethane ionomer is obtained.

EXAMPLE 4

The process is carried out as in Example 1, but instead of polyethylene glycol, polypropylene glycol with an average molecular weight of 2,000 is used. An opaque solution results thereby.

EXAMPLE 5

Comparative Example

This example corresponds to Example 1 from West German Patent Specification No. DE-PS 2,457,972.

Degrees of sizing and Cobb values were determined as disclosed in West German Patent Specification No. DE-PS 2,457,972.

EXAMPLE 6

An unsized base paper (33 parts softwood sulfate pulp, 67 parts of hardwood sulfite pulp, and 13 parts of calcium carbonate) with a surface weight of 80 g/m$^2$ is treated in a sizing press with a sizing liquor, which contains 5% enzymatically degraded starch, 0.065% $CaCl_2$, and 0.2% absolutely dry sizing agent, produced according to Example 1. The paper picks up 3.39% of dry matter, referred to paper weight, in the sizing press.

For comparison, sizing was carried out with use of an anionic sizing agent, prepared according to Example 5 (German Pat. No. 2,457,972), under otherwise identical conditions. Values determined from the paper are presented in Table 1:

TABLE 1

|  | PU Dispersion according to Example 5 | PU Dispersion according to Example 1 |
|---|---|---|
| Degree of sizing (Hercules-sec) | no sizing | 615 |
| Cobb value (water) 1 minute | precipitation of PU | 22 |

EXAMPLE 7

Under otherwise identical conditions as in Example 6, a surface sizing is carried out with the difference that the pH of the sizing liquor is adjusted to various values with 1N HCl or 1N NaOH. Properties determined from the paper are summarized in Table 2:

TABLE 2

|  | PU Dispersion according to Example 5 | PU Dispersion according to Example 1 | | |
|---|---|---|---|---|
| pH | 9./.4 | 7.4 | 6.6 | 4.8 |
| Degree of sizing (Hercules-sec) | no sizing | 648 | 478 | 642 |
| Cobb value (water) | precipitation | 22 | 21 | 22 |

TABLE 2-continued

|  | PU Dispersion according to Example 5 | PU Dispersion according to Example 1 |
| --- | --- | --- |
| 1 minute |  | of PU |

EXAMPLE 8

Under otherwise identical conditions as in Example 6, a surface sizing is carried out with the difference that the sizing liquor contains 0.01% AlCl$_3$ in addition. Properties determined from the paper are summarized in Table 3.

TABLE 3

|  | PU Dispersion according to Example 5 | PU Dispersion according to Example 1 |
| --- | --- | --- |
| Degree of sizing (Hercules-sec) | no sizing | 660 |
| Cobb value (water) 1 minute | precipitation of PU | 22 |

EXAMPLE 9

An unsized base paper ("liner" quality) with a surface weight of 157 g/m$^2$ is treated in a sizing press with a sizing liquor, which contains 5% oxidatively degraded starch and 0.3% absolutely dry sizing agent, produced according to Example 1. The paper picks up 1.49% of dry matter, referred to paper weight, in the sizing press.

A comparison run with a sizing agent was carried out according to Example 6 under otherwise identical conditions. Values determined from the paper are presented in Table 4.

TABLE 4

|  | PU Dispersion according to Example 5 | PU Dispersion according to Example 1 |
| --- | --- | --- |
| Cobb value (water) 1 minute | 150 | 24 |

EXAMPLE 10

An unsized base paper (50% waste paper, namely 25% magazines, 25% newspapers, and 50% pine sulfate) with a surface weight of 120 g/m$^2$ is treated in a sizing press with a sizing liquor, which contains 5% oxidatively degraded starch and 0.4% absolutely dry sizing agent, prepared according to Example 1. The paper picks up 1.4% of dry matter, referred to paper weight, in the sizing press.

For comparison, surface sizing with use of the anionic sizing agent according to Example 5 is run under otherwise identical conditions. Properties determined from the paper are presented in Table 5.

TABLE 5

|  | PU Dispersion according to Example 5 | PU Dispersion according to Example 1 |
| --- | --- | --- |
| Cobb value (water) 1 minute | 125 | 24 |

EXAMPLE 11

Under otherwise identical conditions as in Example 6, a surface sizing is carried out with the difference that a polyurethane dispersion, prepared according to Example 2, is used. Values determined from the paper are presented in Table 6.

TABLE 6

|  | PU Dispersion according to Example 5 | PU Dispersion according to Example 2 |
| --- | --- | --- |
| Degree of sizing (Hercules-sec) | no sizing | 930 |
| Cobb value (water) 1 minute | precipitation | 20 |

What is claimed is:

1. A process for the production of anionic polyurethanes, comprising:

reacting an aliphatic dihydroxy compound, which has an aliphatic substituent with at least 10 carbon atoms, with a polyisocyanate to form a prepolymer with NCO end groups; and chain lengthening by a process selected from the group consisting of (a) chain lengthening said prepolymer with an aliphatic diol which carries an acid group capable of salt formation and at least partially converting said acid group into a salt by reaction with a base, and (b) chain lengthening said prepolymer with an aliphatic diol which carries a salt group; and in the course of said process, adding a polyether compound which carries at least one OH group.

2. A process for the production of anionic polyurethanes, comprising:

reacting an aliphatic dihydroxy compound, which has an aliphatic substituent with at least 10 carbon atoms, with a polyisocyanate to form a prepolymer with NCO end groups;

reacting said prepolymer with an aliphatic trihydroxy compound in a molar ratio of about 1:1 and further with a cyclic anhydride of a dicarboxylic acid to introduce an acid group; and at least partially converting said acid group into a salt by reaction with a base; and in the course of said process, adding a polyether compound which carries at least one OH group.

3. The process according to claim 1, wherein said polyether compound carries two terminal OH groups.

4. The process according to claim 2, wherein said polyether compound carries two terminal OH groups.

5. The process according to claim 3, wherein said polyether compound is at least one polyalkylene glycol.

6. The process according to claim 4, wherein said polyether compound is at least one polyalkylene glycol.

7. The process according to claim 5, wherein said polyalkylene glycol is polyethylene glycol.

8. The process according to claim 6, wherein said polyalkylene glycol is polyethylene glycol.

9. The process according to claim 1, wherein said polyether compound is added in an amount of 5 to 50 weight percent.

10. The process according to claim 2, wherein said polyether compound is added in an amount of 5 to 50 weight percent.

11. The process according to claim 9, wherein said amount is 20 to 30 weight percent.

12. The process according to claim 10, wherein said amount is 20 to 30 weight percent.

13. The process according to claim 5, wherein said polyalkylene glycol has a molecular weight of 200 to 6,000.

14. The process according to claim 6, wherein said polyalkylene glycol has a molecular weight of 200 to 6,000.

15. The process according to claim 13, wherein said polyalkylene glycol has a molecular weight of 1,000 to 3,000.

16. The process according to claim 14, wherein said polyalkylene glycol has a molecular weight of 1,000 to 3,000.

17. The process according to claim 5, wherein said polyalkylene glycol is reacted with the prepolymer.

18. The process according to claim 6, wherein said polyalkylene glycol is reacted with the prepolymer.

19. The process according to claim 1, wherein said process is carried out in a solvent.

20. The process according to claim 2, wherein said process is carried out in a solvent.

21. The process according to claim 1, wherein for the purpose of chain lengthening, in addition to said aliphatic diol, a second aliphatic diol which contains tertiary nitrogen is also reacted with said prepolymer, and a molar ratio of the aliphatic diol with tertiary nitrogen to the aliphatic diol with the acid group or salt group is a maximum of 1:1.

22. The process according to claim 21, where said second aliphatic diol is N-methyldienthanolamine.

23. An anionic polyurethane obtained by the process of claim 1.

24. An anionic polyurethane obtained by the process of claim 2.

25. A process for sizing paper comprising applying to said paper an anionic polyurethane according to claim 23.

26. A process for sizing paper comprising applying to said paper an anionic polyurethane according to claim 24.

* * * * *